Sept. 9, 1941.  D. R. HILLIS  2,255,665

MULTIPLE FEEDER FOR UNIFLOW SYSTEM

Filed Dec. 5, 1936  4 Sheets-Sheet 1

INVENTOR.
David R. Hillis
BY
Ralph S. Kunz
ATTORNEY.

Sept. 9, 1941.　　　　D. R. HILLIS　　　　2,255,665
MULTIPLE FEEDER FOR UNIFLOW SYSTEM
Filed Dec. 5, 1936　　　　4 Sheets-Sheet 2
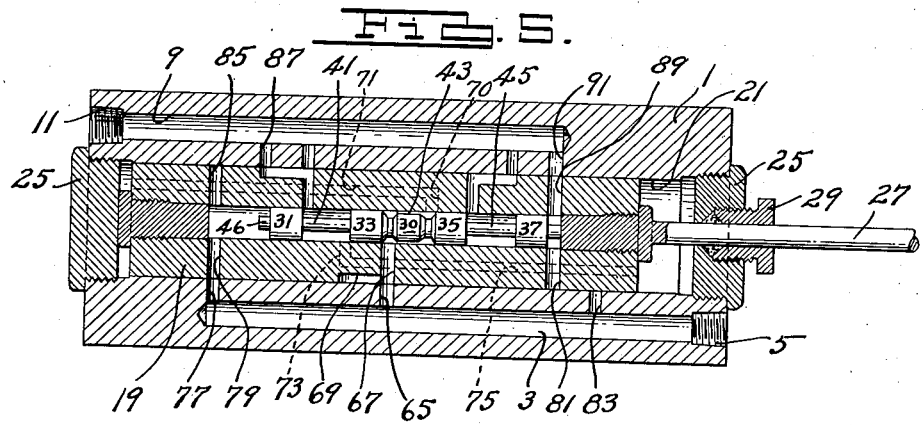
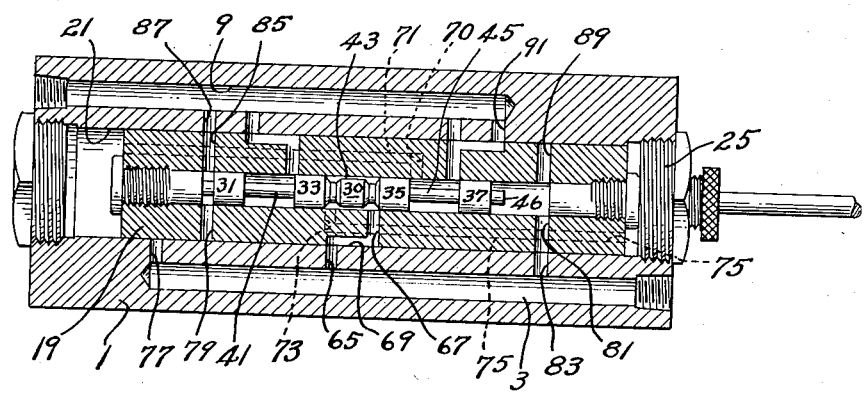
INVENTOR.
David R. Hillis
BY
ATTORNEY.

Sept. 9, 1941. D. R. HILLIS 2,255,665
MULTIPLE FEEDER FOR UNIFLOW SYSTEM
Filed Dec. 5, 1936 4 Sheets-Sheet 3
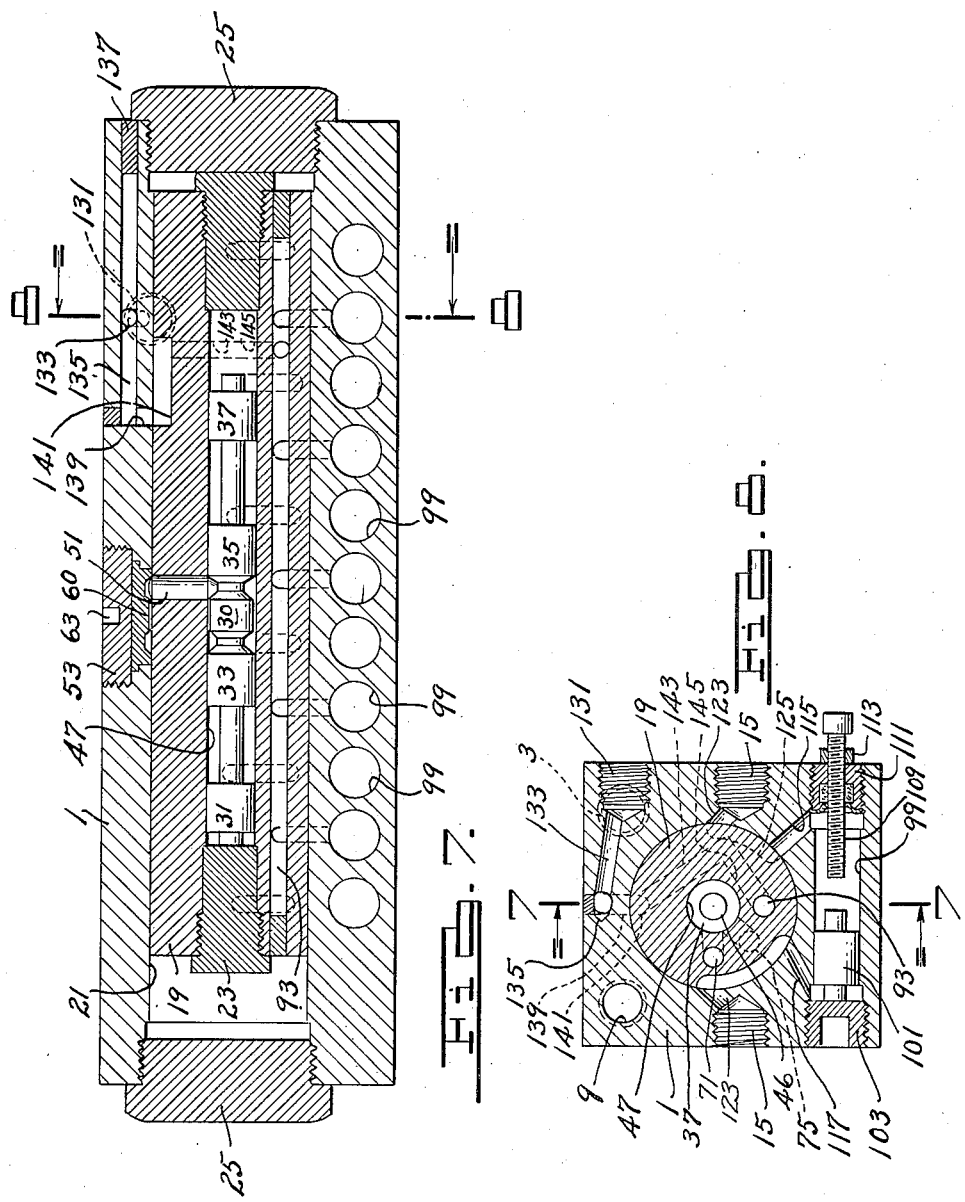
INVENTOR.
David R. Hillis
BY
ATTORNEY.

Sept. 9, 1941.   D. R. HILLIS   2,255,665
MULTIPLE FEEDER FOR UNIFLOW SYSTEM
Filed Dec. 5, 1936   4 Sheets-Sheet 4
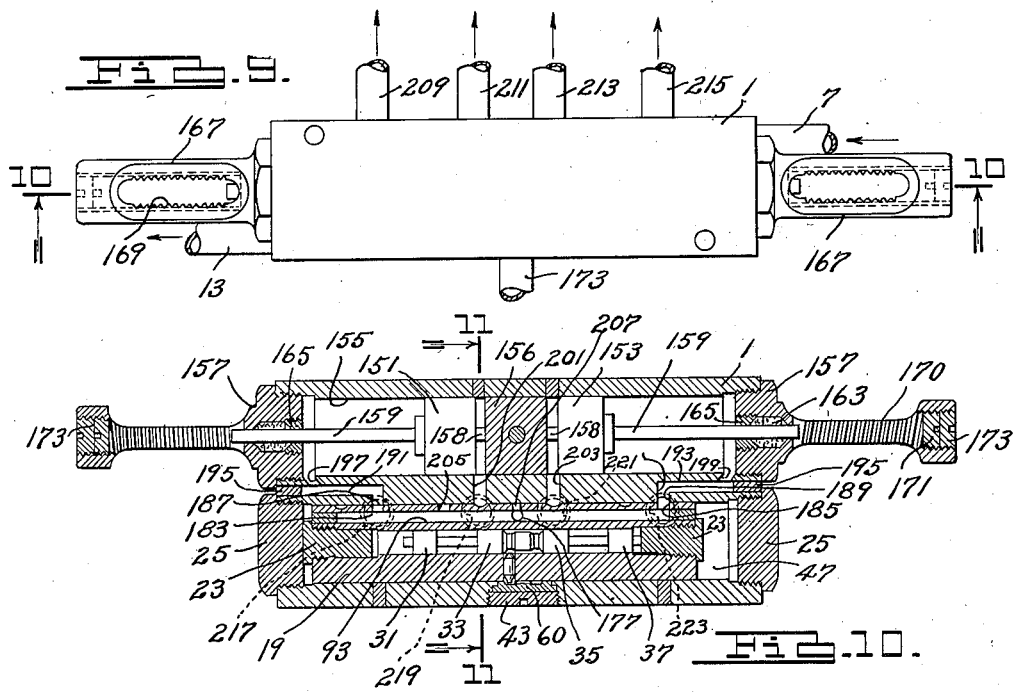
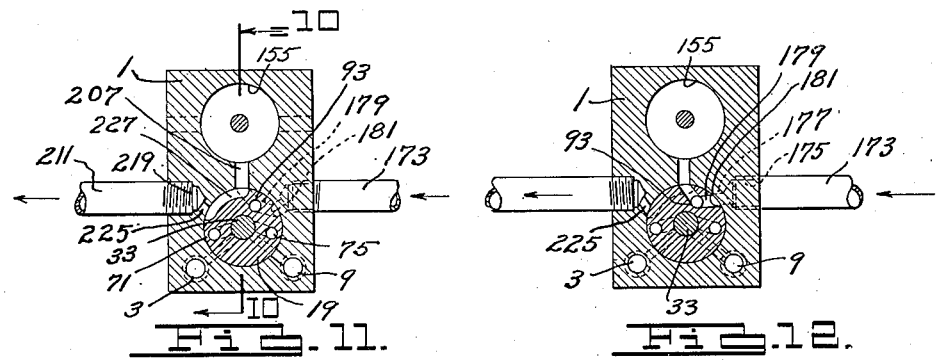
INVENTOR.
David R. Hillis
BY
Ralph S. Binns
ATTORNEY.

Patented Sept. 9, 1941

2,255,665

UNITED STATES PATENT OFFICE 2,255,665

MULTIPLE FEEDER FOR UNIFLOW SYSTEM

David R. Hillis, Detroit, Mich., assignor, by mesne assignments, to Hydraulic Devices, Inc., Detroit, Mich., a corporation of Michigan Application December 5, 1936, Serial No. 114,323

15 Claims. (Cl. 184—7)

My invention pertains to an automatic fluid dispensing device and more particularly to a fluid dispensing feeder for use in a uniflow fluid supply system.

It is an object of my invention to provide a fluid dispensing feeder of positive operating characteristics which is of simple construction and few moving parts and which is adapted for operation in uniflow systems to successively dispense measured quantities of fluid in response to the application of a unidirectional fluid pressure therein.

It is also an object of my invention to provide such a fluid dispensing feeder of the above type comprising a fluid responsive operator having a hollow piston slidably disposed in the feeder casing, a piston valve slidably disposed in the hollow piston and actuated by fluid pressures applied to it by movement of the hollow piston for in turn applying fluid pressures to reversely operate the piston, and fluid dispensing means operated by the movements of said hollow piston for successively dispensing measured quantities of fluid from dispensing ports in said casing.

It is a further object of my invention to provide a fluid dispensing feeder of the above type including an interlocking pin slidably disposed in a side wall of the piston for engaging in recesses in a camming plug disposed in the outer wall of the feeder casing and for engaging two interlocking recesses provided in the slidable piston valve whereby simultaneous relative movement of the piston and valve in response to the fluid pressures applied is positively prevented.

Another object of my invention is to provide a fluid dispensing feeder of the above type comprising an elongated casing having the automatic hydraulic operator piston disposed for slidable movement longitudinally in the casing and fluid dispensing pistons disposed transversely in said casing for slidable movement therein for dispensing measured quantities of fluid successively from the dispensing ports in the elongated side walls of the feeder casing.

A further object of my invention is to provide a feeder of the above type with a separate inlet port to receive dispensing fluid separately from the inlet port which receives the working fluid whereby the device may be operated by any suitable working fluid, such as a light grade of oil or other fluid for dispensing a heavier grade of oil or other fluid which will not be contaminated or co-mingled therewith.

A further object of my invention is to provide a fluid dispensing feeder comprising automatic hydraulically operated means continuously operating in said casing in response to high pressure fluid applied therein for operating relatively large dispensing pistons slidable axially in the casing, an indicator rod projecting from each of said dispensing pistons, a protector sheath partially enclosing each one of said indicator rods and an adjustable stop in each of said protector sheaths for adjustably limiting the movement of the dispensing pistons to adjust measured quantities of fluid thereby dispensed.

The novel features that I consider characteristic of my invention are set forth with particularity in the appended claims. The invention itself, however, both as to its organization and its method of operation, together with additional objects and advantages thereof, will best be understood from the following description of specific embodiments, when read in connection with the accompanying drawings, in which:

Figure 2:
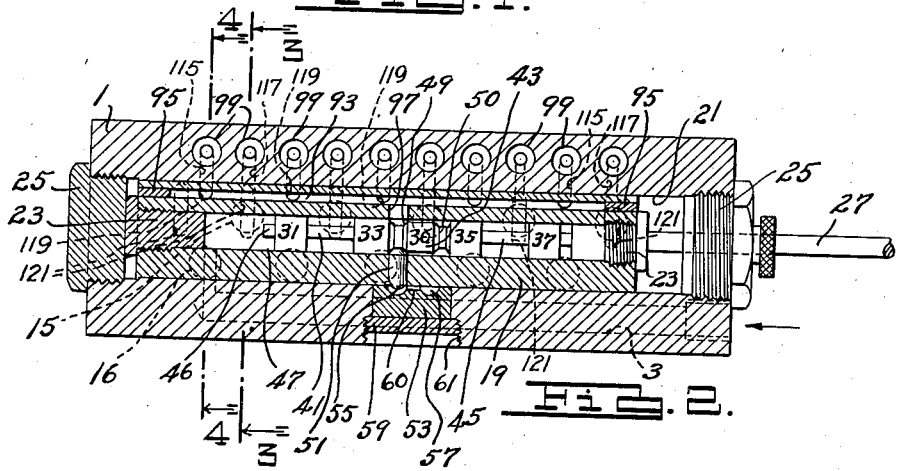
Fig. 2 is a longitudinal sectional view on line 2—2 of Fig. 3.
Figure 3:
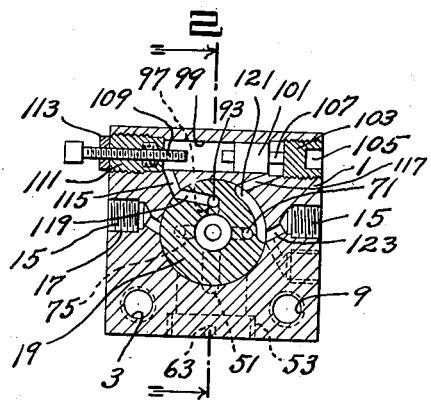
Figure 4:
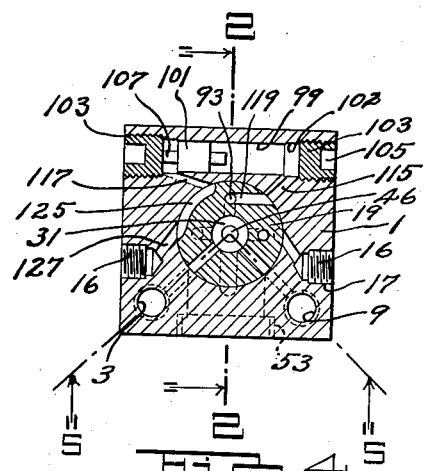

Figs. 3 and 4 are cross sectional views taken respectively on lines 3—3 and 4—4 of Fig. 2;

Fig. 5 is a longitudinal sectional view taken on two planes intersecting at right angles as indicated by line 5—5 on Fig. 4;

Fig. 6 is a similar view showing the positions of the operating elements in a different phase of the operating cycle;

Fig. 7 is a longitudinal view of a different embodiment of my feeder comprising a separate inlet port for independently receiving the fluid to be dispensed taken on line 7—7 of Fig. 8;

Fig. 8 is a transverse sectional view on line 8—8 of Fig. 7;

Fig. 9 is a side elevational view of another embodiment of my invention;

Fig. 10 is a longitudinal view on line 10—10 thereof;

Fig. 11 is a transverse sectional view on line 11—11 of Fig. 10; and

Fig. 12 is a similar view showing the reverse operating connections established by movement of the hydraulic-operator to its alternative position.

Referring more specifically to Figs. 1–6 this embodiment of my fluid dispenser comprising an automatic uniflow operated feeder consists of a metallic body or casing 1 for housing the movable elements therein. For receiving fluid from any suitable high pressure source or system I provide an inlet port 3 comprising a passage drilled longitudinally therein from one end. The inlet port 3 is provided with internal threads 5 adjacent its outer end for convenient connection with the end of a pipe 7 which carries and supplies the fluid to be dispensed under suitable pressure for working the movable elements of the fluid dispenser.

For discharging the fluid, after it has operated the moving parts of the feeder in a manner to be subsequently described, I provide an exhaust port 9 by drilling a passage longitudinally into one end of the casing, preferably from the end opposite from the inlet port to facilitate connecting the device into the system or circuit in which it is to be used. The outer end of the exhaust port 9 has internal threads 11 for convenient connection with an exhaust pipe 13. In use my dispensing feeder is preferably used in a system having suitable means for maintaining a high back pressure of about 500 pounds per square inch in the exhaust pipe. Such a system is fully disclosed in a patent application Serial Number 116,773, filed December 19, 1936.

Fluid dispensing ports 15 and 16 are provided arranged respectively in upper and lower horizontal rows disposed in the two opposite sides of the feeder casing 1 for dispensing fluid therefrom. Ports 15 are shown in cross section in Fig. 3 and ports 16 are shown in Fig. 4. Internal threads 17 are provided in the dispensing ports 15 and 16 to facilitate connection with individual pipes extending separately to the various stations or bearings to be served.

For dispensing the fluid from the ports 15 and 16 automatically in response to unidirectional pressure applied by the fluid in the inlet port 3 of the feeder, I provide a hydraulic-operator comprising a hollow piston 19 which is slidably disposed in a cylindrical aperture or bore 21 extending axially through the casing, and which operates reciprocably therein. The construction and operation of my hydraulic-operator is also disclosed and described in my co-pending application Serial No. 113,873 entitled "Hydraulic-operator" and filed December 2, 1936.

The opposite ends of the hollow piston 19 are closed by piston plugs 23 and the cylinder bore 21 by cylinder plugs 25 which are threadably secured therein. To one of the piston plugs 23 an indicator rod 27 is connected, as by threading or welding, and it projects from the casing through the adjacent cylinder plug 25 which is suitably apertured and provided with a packing nut 29 for compressing suitable packing to provide a sliding seal around the rod in a manner that will be readily understood. As the piston 19 reciprocates in the feeder casing 1, the projected indicator rod 27 provides external indications of the continual operation of the device.

Slidably disposed in the hollow piston is a piston valve 30 of the dumb-bell type comprising fluid flow restricting heads 31, 33, 35 and 37 connected by connecting rods 41, 43 and 45 of reduced cross section to permit fluid to flow freely around. Spacing stop pins 46 project from opposite ends of the valve 30. The middle connector 43, which is smaller in diameter than the bore 47 within the piston, is larger than the other connectors in order to provide interlocking grooves 49 and 50 at opposite ends to be interlockingly engaged by a pin 51 which is slidably disposed in a suitable aperture extending through the side wall of the hollow piston 19 near its mid point. The pin 51 is longer than the aperture in which it is slidably disposed. A camming plug 53, which is inserted through a suitable aperture in the side wall of the casing, is provided with interlocking recesses 55 and 57 for engaging the outer end of the interlocking pin 51. The camming plug 53 has an enlarged head 59 which is threaded for accurately seating in an enlarged counter-bore 61 which is internally threaded for receiving the same. A groove 60 is provided in the inner end of the camming plug 53 for receiving the outer end of locking pin 51 and in cooperation with the recesses, prevents rotation of the hollow piston. A tool receiving aperture 63 is provided in the camming plug.

When the camming plug 53 is properly installed, the camming recesses 55 and 57 on its inner end, are spaced apart in an axial direction in the casing 1 and the distance between them is substantially equal to the distance which the hollow piston 19 is free to slide in cylinder bore 21. This distance is determined by the length of the hollow piston 19 and the projected positions of the inner ends of the cylinder plugs 25. During the slidable movements of the hollow piston 19 in the casing the interlocking pin 51 is depressed by the camming plug 53 to hold the slide valve 30 until the movement of the piston is completed when the slide valve is released, and conversely, when the parts are in position for the slide valve to shift, the cam portions thereof cause the pin to be depressed into either of the camming recesses to prevent movement of the piston 19 simultaneously therewith.

For admitting the high pressure fluid into opposite ends of the cylinder bore 21 to reversely work the hollow piston 19, I provide a passage 65 which leads from the inlet port 3 transversely through the side wall of the bore 21 substantially at the middle of the casing. Near its mid point the side wall of the hollow piston 19 is pierced by a passage 67 and a groove 69 is cut from the outer end axially in the outer surface of the piston whereby a continuous connection is provided to supply fluid pressure in the piston 19 in all positions thereof. The fluid pressure is thus applied around the middle connector 43 of the slide valve in the space in the piston between heads 33 and 35. From the middle of the piston 19 the fluid is passed through a port 70 and an axial passage 71 into the left hand end of the cylinder bore 21 thus shifting the piston 19 to the right, and the slide valve stays in the same relative position to the piston 19, having its head 35 to the right of the port 70. Pressure entering through ports 3, 83 and 81 now shifts slide valve 30 to the left, the parts then being as shown in Fig. 6. The head 33 of the said valve 30 is now at the left of a port 73, and fluid is then passed from the hollow piston through an axial passage 75 into the right hand end of the cylindrical bore 21, as shown in Fig. 6, and the hollow piston 19 is then forced to the left by said fluid pressure.

In order that the reciprocating movement of the hollow piston 19 may continue, as long as fluid pressures are applied in the inlet port 3, it is necessary to move the sliding valve in response to the movements of the piston and this is accomplished by applying fluid pressures alternately into opposite ends of the hollow piston. For this purpose, I provide a passage 77 which connects from the inner end of the inlet port 3 and suitably pierces the side wall of the bore 21 for conductively connecting with a port 79, which pierces the adjacent side wall of the hollow piston, when the piston is at its left position, as in Fig. 5. This tends to push the sliding valve to its right hand position, as shown in Fig. 5. The valve assumes this position immediately after the piston 19 attains its extreme left hand position, and upon its movement the locking pin 51 is depressed into recess 55 in the manner previously described.

When the hollow piston 19 is in its right hand position, as shown in Fig. 6, the port 81, which pierces the side wall thereof, connects conductively with the stationary port 83 which leads into the inlet port 3. This connection applies fluid pressure in the right hand end of the hollow piston for moving the slide valve to the left hand end as viewed in Fig. 6.

In order that the valve may thus continue to slide in alternatively opposite directions in response to fluid pressures applied alternately to opposite ends thereof, it is necessary to exhaust the fluid charged into the opposite end of the hollow piston 19 by the previous operation. For this purpose an exhaust port 85 is so disposed in the piston side wall adjacent the left end of the piston that it connects with a stationary exhaust port 87 leading into the outlet port 9 in the casing, when the piston 19 is in its right-hand position, as in Fig. 6. In the alternate position of the piston 19, as shown in Fig. 5, a port 89 connects with a port 91 leading into the outlet port 9 for exhausting fluid previously charged into the right hand end of the piston.

It will thus be seen that the application of fluid pressure in the inlet port 3 causes pressures to be applied alternately through the passages 71 or 75 for reversely moving the hollow piston under the control of the slidable valve 30 carried therein, and that the movement of the piston completes fluid conducting connections for successively reversely operating the sliding valve. The operation of the sliding valve 30 and of the piston 19 is further controlled by the locking pin 51 which prevents simultaneous movement thereof.

From the respective rows of dispensing ports 15 and 16, measured quantities of fluid are discharged alternately and successively by the continued operation of the hydraulic-operator. For this purpose, the side wall of the hollow piston 19 of my hydraulic-operator is drilled to provide a passage 93 extending axially therethrough, and the ends of the passage are closed by metallic plugs 95 threaded or welded therein. From the intermediate portion of the hollow piston 19, into which fluid pressures are continuously applied from the inlet port 3 as previously explained, I provide a transverse passage 97 which connects into the middle of the elongated axial fluid dispensing passage 93 in the piston.

Figure 1:
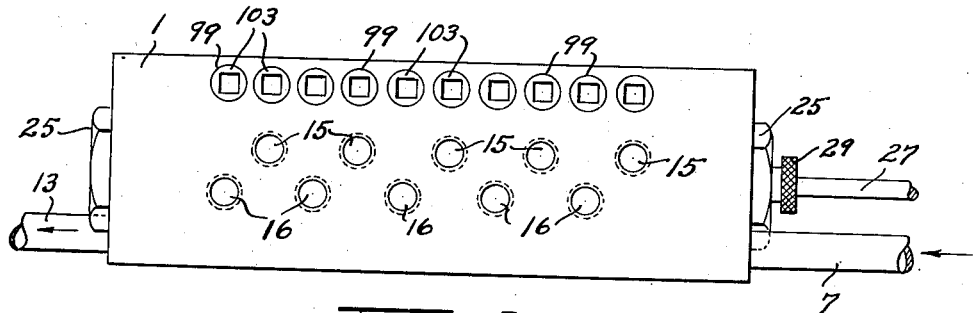
Fig. 1 is a side elevational view of one embodiment of my uniflow fluid dispensing feeder.

In accordance with my invention, the fluid dispensed from the elongated dispensing passage 93 in the piston to the respective dispensing ports 15 and 16 is measured and this is accomplished in measuring chambers 99. There are half as many dispensing chambers as there are ports 15 and 16. For instance, the feeder shown in Fig. 1 is provided with ten measuring chambers 99, and with twenty discharge outlets 15 and 16, half of the outlets being on one side and half on the other side of the feeder.

Each measuring chamber 99 is a cylindrical bore drilled transversely through the casing 1 to slidably receive a measuring piston 101. The ends of the measuring chambers 99 are provided with counter-bores 102 which are threaded for receiving plugs 103, having wrench receiving apertures 105, as shown in Fig. 4. Spacing pins 107 extend from opposite ends of each measuring piston 101 for abutting the end plugs 103 to stop the pistons in spaced relation therefrom.

For adjusting the degree of movement of the measuring piston 101 an adjustable threaded stop rod 109 is threadably mounted in an adjusting plug 111 which may be conveniently installed in any of the chambers where it is desirable to provide for adjusting the measured quantities of fluid discharged therefrom. A wrench receiving portion 113 of square or hexagonal conformation may be provided for installing or removing the adjusting plug 111.

A conduit passage 115 connects from one end of each measuring chamber 99 and extends toward the axis of the cylinder bore 21 for intersection with the side wall thereof. From the opposite end of each measuring chamber, a passage 117 extends to similarly intersect the walls of the cylinder bore 21, but at a smaller angle from the chamber 99. The respective opposing passages 115 and 117 of each measuring chamber 99 thus connect into the cylindrical bore 21 from alternately opposed sides of each succeeding chamber 99, that is to say passage 115, which is directed toward the axis of the bore from one side of the first measuring chamber, is connected from the opposite end of the next measuring chamber, and so on as may be seen in Figs. 2, 3 and 4. Throughout the length of the casing 1, the measuring chambers 99 are thus provided with the end connecting passages 115 and 117 disposed on alternately opposite sides of the casing.

As the piston 19 slides in the casing it dispenses fluid from the elongated dispensing passage 93 into the ends of the measuring chambers 99 through passages 119 provided in the piston and disposed in alternately opposite directions for connecting with the passages 115. By this arrangement the measuring piston 101 in each measuring chamber is moved in the reverse direction, as compared with the adjacent pistons. As shown in Fig. 3, the measuring piston 101 has completed its movement to the right in the measuring chamber, and in so moving it discharged a predetermined quantity of fluid which had been previously charged in on the opposite side of the piston. The dispensed fluid passed out through passage 117 and thence through an arcuate groove 121, cut in the peripheral outer surface of the right side of the piston for connecting with the inner end of a passage 123, through which the dispensed fluid passed out of the adjacent dispensing port 15.

In the next adjacent measuring chamber, as shown in Fig. 4, the fluid under pressure was passed from the dispensing passage 93 by way of passages 119 and 115 into the right end of the chamber 99 forcing the measuring piston 101 to the far or left end and dispensing the fluid previously charged therein, through the passage 117 around an arcuate groove 125 in the left side of the piston and thence by way of a passage 127 out of the adjacent dispensing port 16. There are a total of eleven arcuate grooves 121 and 125 and a total of eleven passages 119 located in the hollow piston 19 or a total of 22 passages, eleven of which are equidistantly and alternately disposed on each side of the hollow piston 11. One side of the piston will have five arcuate grooves and six passages 119 piercing it and the other side of the piston will have six arcuate grooves and five passages 119 piercing it.

There are ten passages 115, five in each side of the casing and ten passages 117, five in each side of the casing. Each measuring chamber 99 has one of each of said passages 115 and 117, one connecting each end to the piston bore 21. The passages 115 and 117 serve alternately as inlet and discharge passages to their respective measuring chambers. When fluid enters a measuring chamber 99 from its associated passage 115, it discharges a measured quantity of fluid from the other or previously charged side of its piston 101 through its associated passage 117 which will then connect with an arcuate groove. When the hollow piston 19 shifts so as to permit pressure fluid to flow through a passage 119 to a passage 117, fluid will then enter the measuring chamber 99 through said passage 117 and its piston 101 will discharge the fluid from the previously charged side of the chamber through its associated passage 115.

Looking at Fig. 2, it will be seen that in the embodiment shown, six grooves 121 are indicated in dotted lines, located on the far side of the piston, all but the extreme left one being shown in position to discharge through the far side outlet ports 15. In the same Fig. 2, it will also be noted that a portion of the bores of five passages 119 are shown and they connect to the five passages 115, shown in dotted lines, which connect to the far side of the first, third, fifth, seventh and ninth measuring chambers 99, counting from the left. The second, fourth, sixth, eighth and tenth measuring chambers 99 are shown having passages 117 (shown in dotted lines) which connect the far side of said measuring chambers with the five of the six arcuate grooves 121 as shown.

There are twenty outlet or discharge ports 15 and 16, five ports 15 and five ports 16, a total of ten being located on each side of the feeder, and there are twenty casing discharge passages 123 and 127 connected thereto, but there are only ten measuring chambers. Hence, when fluid enters one side of a measuring chamber 99, as seen Figs 3 or 4, the hollow piston valve 19 is in position to close one of its associated discharge passages and ports. It follows that only ten of the twenty discharge ports discharge at one time. In Fig. 2, five ports 15 are shown (in dotted lines) connected for discharging on the far side of the casing from the second, fourth, sixth, eighth and tenth measuring chambers 99, while the first, third, fifth and ninth measuring chambers 99 are in position to discharge simultaneously therewith through the five discharge ports 16 that are located on the side of the casing shown in Fig. 1.

As there are twenty-two passages piercing the hollow piston 19, and as eleven of these are equidistantly and alternately spaced on each side of said piston, twenty of them are, consequently, in position to register with the twenty passages 115 and 117 in either extreme position of the hollow piston 19, ten of the twenty passages 115 and 117 acting as inlet passages to their respective measuring chambers at a time, being then in communication with ten of the eleven passages 119 so as to receive fluid under pressure, while the other ten of said passages 115 and 117 act as discharge passages from their respective measuring chambers, being then in communication with ten of the eleven grooves 121 or 125. When the hollow piston 19 shifts, opposite connections are made so that the reverse action takes place.

In a given position of the piston 19 each of the pistons 101 shifts but only one half of the dispensing ports are thus served. When the piston is next moved to its alternate position, by the reciprocating movements automatically induced and maintained by the pressure of the fluid entering the inlet port 3, the other half of the dispensing ports are then served. This is accomplished by the movement of the piston in carrying its dispensing passages 119 to inject fluid into the ends of each measuring chamber from which fluid was discharged by the previous operation. Simultaneously, ten of the eleven arcuate grooves 125 and 121 in the piston, all except the one closest to one of the plugs 25 then abutting the end of the main piston, are connected with the discharging sides of the ten adjacent measuring chambers 99 through ten of the passages 115 and 117 for taking the fluid dispensed therefrom into ten of the twenty adjacent dispensing ports which were disconnected in the previous operation, and simultaneously therewith ten of the eleven passages 119, all except the one closest to one of the plugs 25, are adapted to register with and communicate with ten of the twenty passages 115 and 117 which were disconnected in the previous operation.

In some installations it is desirable to operate the fluid dispensing feeder by means of a working fluid of a different character from the fluid which is to be dispensed by means of my feeder. For example, it is sometimes desirable to operate the feeder by means of an oil of a higher grade than oil or grease which is to be dispensed to bearings although it is to be understood that the use of my automatic feeders is not limited to lubrication systems as it also has many other applications.

When it is desired to use working and dispensing fluids of different characteristics, and to keep them separated, I provide the feeder casing 1 with an independent inlet port 131 for receiving the dispensing fluid, as shown in Figs. 7 and 8. The dispensing fluid inlet port 131 is internally threaded for connection with a suitable pipe line for supplying the dispensing fluid to the feeder separately from the working fluid.

From the inner end of the dispensing fluid inlet port 131, an inlet passage 133 is drilled transversely to intersect a passage 135 which is drilled into the side wall of the casing from one end and substantially parallel to the axis thereof. The outer end of the axial passage 135 is closed by a metallic plug 137, secured in any suitable manner. From the inner end of the axial passage 135 a transverse passage 139 pierces the adjacent side of the cylindrical piston guiding bore 21 for delivering dispensing fluid thereto.

To receive the dispensing fluid thus delivered into the piston guiding bore 21 the hollow piston 19 of the hydraulic-operator, is provided with a groove 141 which is cut in the outer peripheral surface of the piston 19 and which is suitably elongated to provide continuous connection with the inner end of the transverse passage 139 through the entire stroke of the piston 19 as it reciprocates automatically, as previously described, in response to the pressure of the working fluid which is applied in the inlet port 3 of the casing.

In this embodiment of my dispensing feeder, the elongated fluid dispensing passage 93, which extends through the length of the hollow piston 19, is continuously supplied with dispensing fluid under pressure from the inlet port 131 through a passage 143 drilled from the bottom of the groove 141 in the piston and extending perpendicularly to the axis of the piston for intersecting a passage 145 which extends substantially at right angles to intersect the long passage 93 in the piston. The elongated dispensing passage 93 thus receives dispensing fluid continuously and independently of the working fluid which passes through the internal valve guiding bore 47 in the hollow piston 19 for reversely operating the piston 19.

In this embodiment the passages 71 and 75 which discharge working fluid from the piston for reversely moving the same, are drilled through the piston both on the same side of the hollow bore 47 because of the dispensing fluid passages 143 and 145 which pass on the opposite side thereof.

The operation of the hydraulic-operator is not modified by the rearrangement of passages 143 and 145 in the piston, and as the hollow piston 19 reciprocates it dispenses measured quantities of the fluid from the elongated dispensing fluid passage 93 through alternate sets of the dispensing ports in the casing.

In accordance with the embodiment of my feeder, shown in Figs. 9 through 12, I provide two large dispensing pistons 151 and 153 slidably disposed in a cylindrical bore 155 which extends through the casing 1 parallel to the axis thereof, and which is divided in the middle by a plug 156. Stops 158 space the pistons from the plug 156. The ends of the bore 155 are internally threaded to receive cylinder heads 157 therein.

Indicator rods 159 are connected at one end to each of the dispensing pistons, and project in opposite direction from the casing through the adjacent heads 157 which are suitably apertured therefor. Each cylinder head plug 157 comprises a packing gland 161 to receive packing material 163 which is packed around each rod 159 by means of a nut 165. An indicator rod projecting sheath 167 of tubular conformation projects outwardly from each cylinder head 157 and is provided with open side wall portions 169 through which the indicator rods 159 may be observed.

The tubular sheaths 167 are each provided with threads 170 to receive adjustable stop plugs 171 for engaging the outer ends of the indicator rods 159 as they are projected from the casing. By adjusting the positions of the stop plugs 171 in the sheath the degree of movement of the dispensing pistons may be conveniently varied and it naturally follows that the amount of fluid discharged may be varied. A second threaded lock plug 173 is turned into the sheath for locking the stop plug 171.

In this embodiment of my invention, dispensing fluid is supplied through a supply pipe 173 threadably received in a dispensing fluid inlet port 175 connecting through a passage 177 into the side wall of the piston guiding bore 47 at approximately the middle thereof. For continuously charging the passage 93 with dispensing fluid in all positions of the piston 19, I provide a passage 179 which leads transversely from the passage 83 toward the port 175. At its outer end the passage 179 opens into a recess 181 which is elongated axially of the piston for connecting continuously with the inner end of the passage 177 from the dispensing fluid inlet port 175.

For connecting from the outer ends of the elongated dispensing passage 93, the adjacent side walls are pierced by transverse ports 183 and 185 connectable with transverse stationary ports 187 and 189 respectively when the hollow piston 19 is moved to the left. From the stationary ports 187 and 189 passages 191 and 193 respectively connect and each extends longitudinally toward the adjacent end of the casing. The outer ends of the passages are closed by suitable plugs 195 which are recessed as by driving them therein. Passages 197 and 199 are drilled from the open ends of the bore 155 through the side walls into the passages 191 and 193 respectively.

As the dispensing pistons move inwardly toward the dividing block 156 they are stopped in spaced relation therefrom by stops 158. From the space thus defined between the pistons 151 and 153 and the dividing block 156 transverse passages 201 and 203 respectively are drilled through the side wall of the bore 155 through the adjacent side wall of the piston guiding bore 47. For connecting from the long dispensing passage 93 into passages 201 and 203, when the hollow-piston 19 moves to the right, I provide suitably spaced apertures 205 and 207 in the piston.

For dispensing fluid from the casing 1, I connect delivery pipes 209, 211, 213, and 215 into ports 217, 219, 221, and 223 therein, as shown in Fig. 9 and in dotted lines in Fig. 10, and from the inner ends of the ports, passages 225 are drilled through the adjacent side wall of the piston bore 47. As shown in Fig. 11, dispensed fluid is fed from the passage 225 through a groove 227 cut in the outer surface of the piston, when the piston is to the left as in Fig. 10, to supply delivery pipe 211. Four corresponding grooves 227 are cut in the surface of the piston 19 in suitable spaced relations whereby a simultaneous connection is provided for taking fluid through the passage 203 from the left of the piston 153 to pipe 213. When the hollow piston 19 moves to the right, the other two grooves 227 provide connections for feeding delivery pipes 209 and 215 from the outer ends of the pistons 151 and 152 respectively.

In operation the hydraulic-operator piston 19 reciprocates in its bore 47 in response to the pressure of the working fluid supplied to the inlet port of the hydraulic-operator in a manner which has been previously described.

As the piston moves to the left, as shown in Fig. 10, connections are completed from the delivery fluid supply pipe 173 into the outer ends of the bore 155 thus moving the piston 151 and 153 together. During this movement, fluid previously charged into the space adjacent the dividing block 156, is discharged into delivery pipes 211 and 213. When the hollow piston 19 moves to the right hand position, as viewed in Fig. 10, the ports and passages described are connected for injecting dispensing fluid into the bore 155 adjacent the dividing block 156 and the pistons 151 and 153 are are pushed outwardly for discharging measured quantities of fluid into delivery pipes 209 and 215.

It will be noted that any suitable means may be provided for varying the amount of fluid displaced upon each stroke of the piston 19. For instance, by substituting an indicator having a larger diameter, or by using an indicator on both ends of the piston 19, less fluid will be received and displaced in the respective ends of the cylinder bore 21 of the casing and thus the reciprocation of the piston will be speeded up materially.

Aside from the specific embodiments of the invention herein shown and described, it will be understood that numerous details of the con-

I claim:

1. A fluid dispensing feeder for use in a uniflow system comprising, a casing, an inlet port for connecting high pressure fluid into said casing, a piston operator slidably disposed in said casing, a fluid responsive valve for applying fluid pressures from said inlet port to reversely move said piston in said casing, fluid conduits controlled by the reciprocations of said piston for applying fluid pressures to reversely operate said valve whereby the piston and valve automatically perform successive operating cycles in response to suitable fluid pressure applied in said inlet port, fluid dispensing ports in said casing, pressure actuated fluid measuring means controlled by the reciprocations of said fluid responsive means for dispensing fluid out of said dispensing ports and a separate port adapted to continuously discharge a portion of the high pressure fluid that enters said casing through the inlet port and that passes through said casing and operates said fluid responsive means.

2. A fluid dispensing feeder for use in a uniflow system comprising, a casing, an inlet port for connecting high pressure fluid into said casing, a hollow piston operator slidably disposed in said casing, a fluid responsive valve slidably disposed therein, fluid controlling ports and passages controlled thereby for applying fluid pressures from said inlet port to reversely move said piston in said casing, fluid controlling ports and passages controlled by the reciprocations of said piston for applying fluid pressures to reversely operate said valve whereby the piston and valve automatically perform successive operating cycles in response to suitable fluid pressure applied in said inlet port, fluid dispensing ports in said casing, pressure actuated fluid measuring pistons controlled by the reciprocations of said fluid responsive piston for dispensing fluid out of said dispensing ports and a port for exhausting the working fluid after it has actuated said piston operator.

3. A fluid dispensing feeder for use in a uniflow system comprising, a casing, an inlet port for connecting high pressure fluid into said casing, a hollow operator piston slidably disposed in said casing, a fluid responsive valve slidably disposed in said piston for applying fluid pressures from said inlet port to reversely operate the piston in the casing, fluid conducting means controlled by said piston for reversely moving said valve, an interlocking pin slidably disposed in a side wall of said hollow piston, a pair of interlocking recesses disposed in said valve for interlocking engagement by the inner end of said pin, a camming plug secured in a side wall of said casing provided with spaced camming recesses for interlocking engagement by the outer end of said pin whereby simultaneous movement of the hollow piston and the said valve is prevented, fluid dispensing ports in said casing, fluid measuring means controlled by the reciprocations of said hollow piston for dispensing measured quantities of fluid from said dispensing ports, and a port for exhausting the working fluid after the hollow piston has been actuated thereby.

4. A fluid dispensing feeder for use in a uniflow system comprising, an elongated casing, an inlet port for receiving high pressure fluid into said casing, fluid responsive means slidably disposed for reciprocation longitudinally in said casing, dispensing ports in said casing, fluid responsive dispensing means disposed for transverse movement in said casing for dispensing measured quantities of fluid from said dispensing ports, fluid conducting means controlled by the movements of said fluid responsive means for applying fluid pressures to actuate said dispensing means and a separate port adapted to continuously discharge a portion of the high pressure fluid that enters said casing through the inlet port and that passes through said casing and operates said fluid responsive means.

5. A fluid dispensing feeder for use in a uniflow system comprising, an elongated casing, an inlet port for receiving high pressure fluid into said casing, fluid responsive means slidably disposed for reciprocation longitudinally in said casing, dispensing ports in said casing, fluid responsive dispensing pistons disposed for slidable movement transversely in said casing, for dispensing measured quantities of fluid from said dispensing ports, fluid conducting means controlled by the movements of said fluid responsive means for applying fluid pressures to actuate said dispensing pistons in opposite directions, and a separate port adapted to continuously discharge a portion of the high pressure fluid that enters said casing through the inlet port and that passes through said casing and operates said fluid responsive means.

6. A fluid dispensing feeder for use in a uniflow system comprising, an elongated casing, a hollow piston slidably disposed for longitudinal movement in said casing, an inlet port for applying high pressure fluid therein, fluid responsive valve means in said piston actuated by fluid pressures applied therein in accordance with the movements of said piston, fluid conducting means controlled by the movements of said valve means for reversely operating said piston in response to the fluid pressure applied in said inlet port, dispensing ports in said casing, dispensing pistons disposed for slidable movement in said casing for discharging measured quantities of fluid from said dispensing ports, fluid conducting means controlled by a movement of said hollow piston for applying high fluid pressure to one side of each dispensing piston, and for simultaneously connecting from the opposite side of each dispensing piston to a corresponding alternate one of said dispensing ports for discharging a measured quantity of fluid therefrom, fluid conducting means actuated by the reverse movement of said hollow piston for alternately applying high fluid pressure first to one side and then to the reverse side of each dispensing piston and for simultaneously connecting the opposite side of each dispensing piston to the alternate ones of said dispensing ports and an exhaust port for discharging working fluid from said casing.

7. A fluid dispensing feeder for use with a separate working fluid supply source comprising a casing, a fluid responsive operating piston slidably disposed in said casing, valve means controlled by the movements of said piston for applying fluid pressures to reversely operate the piston, fluid measuring dispensing pistons slidably disposed in said casing, a working fluid inlet port for supplying working fluid to operate said operating piston, a dispensing fluid inlet port for supplying dispensing fluid to said dispensing pistons, dispensing ports in said casing, and reversing fluid conducting connections controlled by said operating piston in the alternate positions thereof for alternately connecting the dispensing fluid inlet port to opposite sides of each dispensing piston whereby the said dispensing pistons discharge a quantity of fluid out of half the dispensing ports upon each reciprication of the operating piston.

8. A fluid dispensing feeder for use with a separate working fluid supply source comprising, an elongated casing, a working fluid inlet port, an operating piston sliding longitudinally in said casing, valve means controlled by said piston for automatically reciprocating the same in response to fluid pressure in said working fluid inlet port, an elongated passage disposed in said casing substantially parallel to said operating piston, a dispensing fluid inlet port connecting into said passage, a plurality of dispensing ports in said casing, fluid flow measuring means, fluid conducting means controlled by a movement of said operating piston for completing a connection from each of said dispensing ports through said fluid flow measuring means to said dispensing fluid inlet port, and means responsive to the reverse movement of said operating piston for reversing the connection from each dispensing port through the fluid flow measuring means whereby said measuring means is reversely operated.

9. A fluid dispensing feeder comprising, a casing, an inlet port for receiving high pressure fluid therein, a piston operator slidably disposed in said casing, a valve actuated in accordance with the movements of said piston for applying fluid pressures from said inlet port to reversely operate said piston, dispensing ports in said casing, fluid dispensing means actuated by the reciprocating movements of said piston for dispensing fluid from said fluid dispensing ports, and an indicator rod connected to said piston operator and projecting from said casing for providing visual manifestation of the operation thereof.

10. A fluid dispensing feeder for use in a uniflow system comprising a casing, an inlet port for receiving high pressure fluid therein, a fluid actuated piston slidably operated in said casing, valve means actuated in accordance with the movements of the piston for applying fluid pressures from said inlet port to reversely operate said piston, a dispensing fluid inlet port in said casing, a pair of relatively large fluid dispensing pistons slidably disposed in separated relation for sliding axially in said casing, a pair of fluid dispensing ports associated with each dispensing piston, and fluid conducting means controlled by the movements of said operator piston for directing fluid from said dispensing fluid inlet port for reversely operating said dispensing pistons for dispensing measured quantities of fluid alternatively from the respective pairs of dispensing ports associated therewith.

11. A fluid dispensing feeder for use in a uniflow system comprising, a casing, an inlet port for receiving high pressure fluid therein, a fluid actuated piston slidably operated in said casing, valve means actuated in accordance with the movements of the piston for applying fluid pressures from said inlet port to reversely operate said piston, a dispensing fluid inlet port in said casing, a pair of relatively large fluid dispensing pistons slidably disposed in separated relation for sliding axially in said casing, a pair of fluid dispensing ports associated with each dispensing piston, fluid conducting means controlled by the movements of said operator piston for directing fluid from said dispensing fluid inlet port for reversely operating said dispensing pistons for dispensing measured quantities of fluid alternatively from the respective pairs of dispensing ports associated therewith, an indicator rod connected from each dispensing piston and projecting axially from each respective end of said casing, a protector sheath partially enclosing each one of said indicator rods and an adjustable stop supported in each protector sheath for adjustably limiting the outward movement of each of said indicator rods for adjusting the measured quantities of fluid dispensed from said casing.

12. A fluid dispensing feeder for use in a uniflow system comprising, a casing, an inlet port adapted to continuously receive a unidirectional high pressure fluid therein, a reciprocable fluid responsive member movably disposed in said casing, said member being actuated by the fluid as it passes through the feeder, fluid dispensing ports in said casing, means associated with said fluid responsive member for dispensing fluid from one half of said dispensing ports simultaneously while said member is in one of its extreme positions and for dispensing fluid from the other half of said dispensing ports simultaneously while it is in its other extreme position, and a separate port adapted to unidirectionally discharge a portion of the high pressure fluid that enters said casing through the inlet port and that passes through said casing and operates said fluid responsive member.

13. A fluid dispensing feeder for use in a uniflow system comprising, a casing, an inlet port adapted to continuously receive high pressure fluid therein, a cylinder in said casing, a reciprocable fluid responsive piston movably disposed in said cylinder, said piston being actuated by the fluid as it passes through the feeder, fluid dispensing ports in said casing, means associated with said fluid responsive piston for dispensing fluid simultaneously from one half of said dispensing ports while said member is in one of its extreme positions and for dispensing fluid simultaneously from the other half of said dispensing ports while it is in its other extreme position, a separate port adapted to unidirectionally discharge a portion of the high pressure fluid that enters said casing through the inlet port and that passes through said casing and operates said fluid responsive piston.

14. A fluid dispensing feeder for use in a uniflow system comprising, a casing, an inlet port adapted to continuously receive a unidirectional high pressure fluid therein, a fluid responsive piston disposed in said casing, movable alternately to opposite extreme positions by energy derived from uniflow high pressure fluid received in said inlet port and actuating said piston as said fluid passes through the feeder, fluid dispensing ports in said casing, means for dispensing fluid from alternate ones of said dispensing ports during the times that said piston is in an alternate extreme position, and a separate port adapted to unidirectionally discharge a portion of the high pressure fluid that enters said casing through the inlet port and that passes through said casing and operates said fluid responsive member.

15. A fluid dispensing feeder for use in a uniflow system comprising, a casing, an inlet port adapted to continuously receive high pressure fluid therein, fluid responsive control means movably disposed in said casing for reciprocable movement by energy derived from uniflow high pressure fluid received in said inlet port, fluid dispensing ports in said casing, separately movable fluid measuring means controlled by fluid pressures applied by the reciprocations of said fluid responsive means for dispensing measured quantities of fluid from said fluid dispensing ports, and a separate port adapted to unidirectionally discharge a portion of the high pressure fluid that enters said casing through the inlet port and that passes through said casing and operates said fluid responsive means.

DAVID R. HILLIS.